(12) United States Patent
Del Corso et al.

(10) Patent No.: US 11,845,040 B2
(45) Date of Patent: Dec. 19, 2023

(54) FLUE GAS TREATMENT METHOD AND INSTALLATION

(71) Applicant: L'Air Liquide, Société Anonyme pour l'Etude et l'Exploitation des Procédés Georges Claude, Paris (FR)

(72) Inventors: Fabrice Del Corso, Saclay (FR); Jean Caudal, Versailles (FR); Xavier Paubel, Montigny le Bretonneux (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 0 days.

(21) Appl. No.: 17/573,903

(22) Filed: Jan. 12, 2022

(65) Prior Publication Data

US 2022/0219117 A1   Jul. 14, 2022

(30) Foreign Application Priority Data

Jan. 12, 2021 (EP) ..................... 21151089
Jan. 29, 2021 (EP) ..................... 21154239

(51) Int. Cl.
*B01D 51/10* (2006.01)
*B01D 53/02* (2006.01)
(Continued)

(52) U.S. Cl.
CPC ............. *B01D 53/60* (2013.01); *B01D 51/10* (2013.01); *B01D 53/02* (2013.01); *C01B 32/50* (2017.08);
(Continued)

(58) Field of Classification Search
CPC ........ B01D 53/60; B01D 51/10; B01D 53/02; B01D 53/002; B01D 2258/0283;
(Continued)

(56) References Cited

U.S. PATENT DOCUMENTS 5,057,133 A   10/1991  Chen et al.
5,743,929 A   4/1998   Kapoor et al.
(Continued)

FOREIGN PATENT DOCUMENTS

CN    113 310 063 A  *  8/2021  ............. C01B 32/50
EP    3 670 705         6/2020
WO    WO 2010 036668   4/2010

OTHER PUBLICATIONS

European Search Report and Written Opinion for corresponding EP 21154239, dated Jul. 15, 2021.

*Primary Examiner* — Timothy C Vanoy
(74) *Attorney, Agent, or Firm* — Elwood L. Haynes

(57) ABSTRACT

Method and installation for treating a $CO_2$- and $H_2O$-containing flue gas generated by an industrial process unit before CCUS, whereby the flue gas evacuated from the unit is subjected to cooling to a temperature T2 between 100 and 600° C., whereby the cooled flue gas is pretreated in one or more particle removal and/or gas cleaning and/or drying stages and the temperature of the cooled flue gas is further reduced to a temperature T3<T2, before a first part of pretreated flue gas is subjected to CCUS, a second part of the pretreated flue gas being recycled at temperature T3 as a cooling agent and mixed with the flue gas during the controlled cooling thereof, partially or fully purified $CO_2$ from the CCUS may be recycled at temperature T4<T2 may be recycled as a cooling agent and mixed with the flue gas during the controlled cooling.

3 Claims, 1 Drawing Sheet

(51) Int. Cl.
  *B01D 53/60*   (2006.01)
  *C01B 32/50*   (2017.01)
  *B01D 53/00*   (2006.01)
  *C03B 5/235*   (2006.01)

(52) U.S. Cl.
  CPC .... *B01D 53/002* (2013.01); *B01D 2258/0283* (2013.01); *C03B 5/235* (2013.01)

(58) Field of Classification Search
  CPC .. B01D 53/62; B01D 2257/504; B01D 53/74; B01D 53/75; C01B 32/50; C03B 5/235; Y02C 20/40; Y02P 20/151
  See application file for complete search history.

(56) References Cited

U.S. PATENT DOCUMENTS

| | | | |
|---|---|---|---|
| 5,925,326 A | 7/1999 | Kapoor et al. | |
| 2004/0229091 A1* | 11/2004 | Rowe | C01B 3/16 48/198.3 |
| 2010/0284892 A1* | 11/2010 | Grover | B01D 53/343 423/437.1 |
| 2012/0023947 A1* | 2/2012 | Kulkarni | F23J 15/06 60/693 |
| 2012/0318141 A1* | 12/2012 | Tsujiuchi | F23L 15/04 96/242 |
| 2014/0020398 A1 | 1/2014 | Mittricker et al. | |
| 2018/0155202 A1* | 6/2018 | Alekseev | H02K 7/1823 |
| 2019/0022573 A1 | 1/2019 | Weston | |

\* cited by examiner

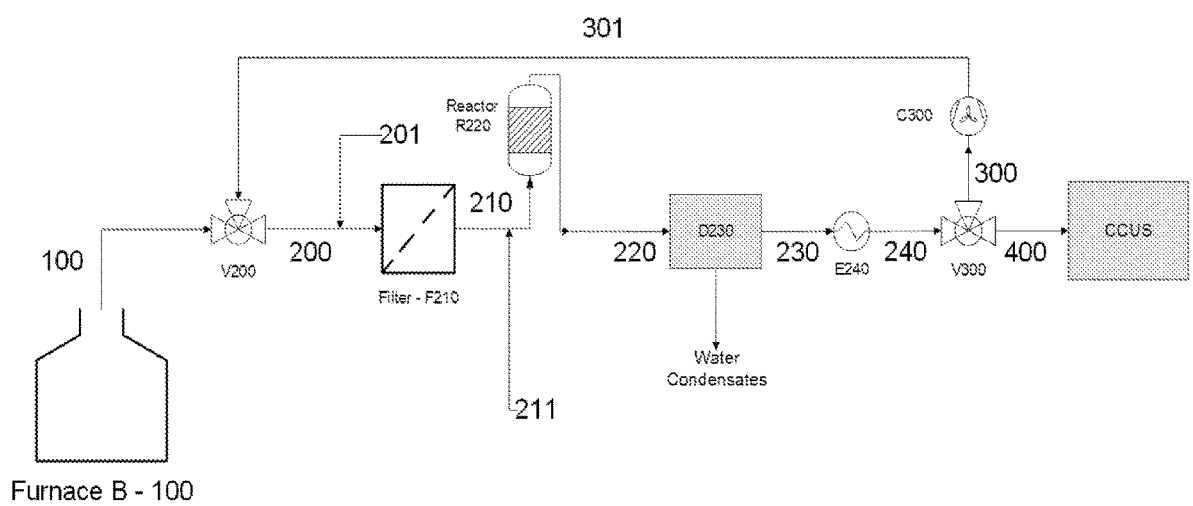

FLUE GAS TREATMENT METHOD AND INSTALLATION

CROSS REFERENCE TO RELATED APPLICATIONS

This application claims the benefit of priority under 35 U.S.C. § 119 (a) and (b) to European Patent Application Nos. EP 21151089, filed Jan. 12, 2021, and EP 21154239, filed Jan. 29, 2021, the entire contents of which are incorporated herein by reference.

BACKGROUND

The present invention relates to the treatment of high-temperature $CO_2$-containing flue gas in the context of Carbon Capture Utilization and/or Storage (or Sequestration) CCUS.

A major source of high-temperature $CO_2$-containing flue gas are combustion processes and installations, i.e furnaces. Combustion processes or furnaces burn a fuel, typically hydrocarbons like natural gas or fuel oil or solid combustible material (coal, consumable electrodes of an electric arc furnace (EAF), etc.), with an oxidant, such as air.

In addition to heat, such combustion processes and furnaces produce a flue gas. The flue gas is typically a mixture of ingredients, the composition of which depends on the combustion process parameters, including the type of fuel, the type of oxidant, the combustion stoichiometry, temperature, etc.

Typical flue gas components are:
- $CO_2$ and water (typically resulting from the oxidation of the fuel),
- oxygen (in particular when combustion is performed with a stoichiometric excess of oxidant)
- nitrogen (which, for example, may be introduced into the furnace with the oxidant, when air or oxygen-enriched air is used as the oxidant or due to air ingress into the furnace),
- impurities such as NOx, SOx, dust, etc.

Other sources of impure high-temperature $CO_2$-containing flue gas are, for example, processes for the electrolysis of non-ferrous metal, whereby the cathode chamber of the electrolyser generates the $CO_2$-containing flue gas.

Carbon dioxide ($CO_2$) is considered a major contributor to global warming. CCUS is one of various methods which have been proposed to reduce anthropogenic emissions of $CO_2$.

The Carbon Capture step of the CCUS process requires purification of the $CO_2$ from the flue gas.

When the flue gas is evacuated at high temperature, the flue gas has to be cooled to a temperature suitable for some downstream process operations needed to remove impurities from the flue gas (for example, deSOx, deNOx and particle removal by filters).

Very often, injection of ambient air into the flue gas is used for cooling.

Cooling the flue gas with air injection causes an increase in the flue-gas volume and thus of the size and costs of downstream equipment for the treatment of flue gas. In addition, using air injection to cool the flue gas decreases the $CO_2$ concentration in the flue gas and thus increases the operating and investment costs for $CO_2$ purification and concentration in the case of CCUS.

Indirect flue-gas cooling with external fluids in a heat exchanger, whereby the flue gas does not mix with the coolant, could be used instead of air injection and may even allow to valorize heat thus extracted from the flue gas, but such alternatives are capital intensive and not always technically feasible because of the high temperature of the flue gas.

Another solution, described in U.S. Pat. Nos. 5,743,929 and 5,925,326, involves quenching the flue gas with aqueous quench liquid, however, this requires separate equipment for processing the spent quench fluid.

SUMMARY

The present invention proposes an improved method of treating a $CO_2$-containing flue gas, which at least in part overcomes the above mentioned drawbacks and which is suited for use in a CCUS process.

The present invention relates more specifically to a method of treating a $CO_2$- and $H_2O$-containing flue gas.

According to said method, the flue gas is evacuated at a first temperature T1 from a flue-gas-generating unit (step a) and subjected to controlled cooling to a temperature T2<T1, whereby T2 is between 100 and 600° C., preferably between 200 and 400° C. (step b).

The thus obtained cooled flue gas is pretreated in one or more gas cleaning and/or drying stages (step c). During said pretreatment, the temperature of the cooled flue gas is further reduced to a temperature T3<T2, A first part of the pretreated flue gas thus obtained is subjected to CCUS (step d), thus reducing emissions of the greenhouse gas $CO_2$.

According to the present invention, a second part of the pretreated flue gas is recycled at temperature T3 as a cooling agent and mixed with the flue gas during the controlled cooling of the flue gas (step b).

Alternatively, or in combination therewith, a fraction of partially or fully purified $CO_2$ obtained at a temperature T4<T2 in step d may be recycled as a cooling agent and mixed with the flue gas during the controlled cooling of the flue gas (step b). In that case, during the CCUS of step d, the first part of the pretreated flue gas is purified so as to obtain $CO_2$ of the purity required for Sequestration and/or Use. Step d thus includes a substep of purifying said first part. During said purification substep, gaseous components other than $CO_2$ which are present at a level of at least 1% vol in the first part of the pretreated flue gas are removed therefrom so as to obtain purified $CO_2$. In practice, the purification substep may comprise a succession of multiple purification stages terminating in a final purification stage. The stage or stages preceding the final stage generate partially purified $CO_2$. The final stage generates the above-mentioned purified $CO_2$. It will be appreciated that multiple purification stages may take place in separate purification devices or in a single purification device. For example, in the case of a distillation column for the purification of a fluid, the final purified fluid may be obtained at one extremity of the column, whereas partially purified fluid can be extracted from the column at an intermediate level corresponding to an intermediate stage of the purification process.

In the present context, the term "controlled cooling" refers to a cooling process which is regulated so that the temperature of the cooled medium at the end of the cooling is of a predetermined value or within a predetermined range.

Condensation of water vapour, susceptible to cause problems in the downstream equipment, is prevented in that the temperature of the flue gas is kept at 100° C. or above during controlled cooling.

After the flue gas has been dried/dehumidified, the temperature of the flue gas can be lowered to below 100° C., without risk of water vapour condensation in the downstream equipment.

Temperature T3 of step c may thus be below 100° C.

The greater the difference between T1 and T3, the more effective is the cooling of the evacuated flue gas when it is mixed with the recycled second part of the pretreated flue gas, i.e. the lower the amount of recycled pretreated flue gas required in order to achieve a given temperature drop of the flue gas during the step of controlled cooling. For example, T3 may be at least or more than 50° C. below T1.

Similarly, the greater the difference between T1 and T4, the more effective is the cooling of the evacuated flue gas when it is mixed with the partially or fully purified $CO_2$, i.e. the lower the amount of partially or fully purified $CO_2$ in order to achieve a given temperature drop of the flue gas during the step of controlled cooling. For example T4 may be at least or more than 50° C. below T1.

Other factors which influence the temperature to which the flue gas is cooled in a controlled manner during step b, i.e. the abovementioned "predetermined temperature", is the nature of the equipment used in the downstream process steps. Indeed, a primary aim of the controlled cooling is to prevent the hot flue gases from damaging the downstream equipment receiving the cooled flue gas, such as dust filter equipment, and to ensure optimum operation of the downstream processes.

The controlled cooling step thus comprises mixing of the evacuated flue gas with the recycled second part of pretreated flue gas and/or with the recycled partially or fully purified $CO_2$. In the method according to the present invention, controlled cooling step b may consist entirely of such cooling by mixing, or may comprise cooling by mixing with recycled pretreated flue gas and/or with the recycled partially or fully purified $CO_2$ in combination with one or more other cooling steps.

For example, after evacuation from the flue-gas-generating unit, the flue gases may be subjected to controlled cooling by first cooling the hot flue gases to an intermediate temperature T2bis>100° C. by mixing said hot flue gas with the recycled second part of pretreated flue gas and/or with recycled partially or fully purified $CO_2$, followed by further controlled cooling to temperature T2 by means of heat exchange. As indicated earlier, the high temperature of the flue gas may render indirect flue-gas cooling with external fluids in a heat exchanger problematic because, for example, limitations to the mechanical resistance of the material or the oxidation of the material used for such an heat exchanger. By first slightly lowering the temperature of the evacuated flue gas in a controlled manner by mixing with recycled pretreated flue gas and/or with recycled partially or fully purified $CO_2$ to an intermediate temperature T2bis, less nobel and thus less expensive materials may be used for the construction of the heat exchange equipment for the partially cooled mixed flue gas stream.

Alternatively, when the temperature of the evacuated flue gas from the generating unit is not too high for the heat exchanger used, useful heat may be recovered from the evacuated flue gas by heat exchange, thereby cooling the evacuated flue gas to intermediate temperature T2bis, before the evacuated flue gas is further cooled to temperature T2 by mixing the partially cooled flue gas with recycled pretreated flue gas and/or with the recycled partially or fully purified $CO_2$. Indeed, the efficiency of heat recovery from a fluid (such as flue gas) by heat exchange generally increases with increasing temperature of the fluid from which heat is extracted.

It is also possible to combine the two options. In other words, the controlled cooling step may comprise cooling the flue gas to a temperature T2ter by heat recovery by heat exchange, followed by further cooling to a temperature T2bis<T2ter by mixing the partially cooled flue gas with recycled pretreated flue gas and/or with recycled partially or fully purified $CO_2$, this step being in turn followed by further cooling to temperature T2 by heat recovery by heat exchange.

Heat thus extracted from the flue gas by heat exchange may be used as an energy source, for example for heating, for the production of mechanical energy and/or for the production of electrical energy. According to a preferred embodiment, controlled cooling step b comprises a step of cooling by heat exchange and heat thus extracted from the flue gas is used for preheating fuel and/or oxidant before its/their introduction into a combustion unit, in particular a combustion unit which generates all or part of the hot flue gas.

By using, for the cooling of the evacuated flue gas by mixing, pretreated flue gas (recycled second part) with a $CO_2$ content at least equal to (i.e. equal to or greater than) the $CO_2$ content of the evacuated flue gas, a reduction in the $CO_2$-level of the evacuated flue gas, as encountered when mixing with air, is avoided. The same is naturally also the case when the evacuated flue gas is mixed with partially or fully purified $CO_2$ from step d (CCUS).

As the pretreatment step (step c) involves the removal of ingredients, such as humidity, NOx and SOx from the flue gas, no additional steps are typically required to ensure that the $CO_2$ concentration of the pretreated flue gas is at least equal to the $CO_2$ concentration of the flue gas evacuated during step a. The same is true for the CCUS substep of purifying the first part of the pretreated flue gas.

According to a specific embodiment of the present invention, the cooling agent mixed with the flue gas in step b corresponds to a second part of pretreated flue gas obtained in step c which is recycled and not sent to step d.

On the other hand, when the cooling agent mixed with the flue gas in step b corresponds to a recycled fraction of the partially or fully purified $CO_2$ obtained at in step d, then all pretreated flue gas obtained in step c is sent to CCUS (step d) and no pretreated flue gas obtained in step c is recycled to step b (i.e. the recycled second part of pretreated flue gas is zero).

As indicated above, all or part of the $CO_2$- and $H_2O$-containing flue gas to be treated may be generated by a flue-gas-generating combustion unit or installation, also referred to as a combustion furnace. In the combustion unit, a carbon-containing fuel is typically combusted with a combustion oxidant containing 21% to 100% by volume oxygen.

Switching from air combustion (i.e. combustion with air as oxidant) to oxycombustion (i.e. combustion with an oxidant having an oxygen concentration higher than the oxygen concentration of atmospheric air) is a means to decrease the cost of the $CO_2$ capture, as the flue gas leaving the furnace is more concentrated in $CO_2$ due to the reduction of the nitrogen concentration in the oxidant and thus also in the flue gas.

Thus, according to a particularly useful embodiment, all or part of the flue gas to be treated is generated by a combustion unit in which is combusted with a combustion oxidant comprising at least 30% by volume and up to 100% by volume, more preferably at least 60% by volume and even more preferably at least 90% by volume oxygen.

Combustion units of particular interest are glass-melting furnaces, glass refining furnaces, glass melting-and-refining furnaces, steel reheating furnaces, Electric Arc furnaces, non-ferrous smelting and melting furnaces, cement furnaces, lime furnaces, enamel furnaces and hot stoves.

Other flue-gas-generating units from which the flue gas may be treated in accordance with the invention include non-ferrous primary electrolyzer, ferrous primary electrolyzer, cokery, electric furnace for glass melting, electric furnace for special metal melting or heat treatment.

When multiple installations generating a $CO_2$- and $H_2O$-containing flue gas are present, the flue-gas-generating unit may contain a multitude of such installations, so that the flue gas which is evacuated from the flue-gas-generating unit at temperature T1 comprises a mixture of flue gases generated by said installations.

According to a preferred embodiment, the first and second part of pretreated flue gas together correspond to all of the pretreated flue gas obtained in step c. In other words, after pretreatment, the totality of the flue gas evacuated from the combustion unit in step a is sent to CCUS or recycled to step b.

Advantageously, the first part of the pretreated flue gas, dedicated to CCUS, contains at least 50%, preferably at least 60% and more preferably at least 75% of the $CO_2$ present in the evacuated flue gas obtained in step a, thus providing effective reduction of $CO_2$ emissions.

Pretreatment step c typically includes a drying stage during which water vapour/humidity is removed from the flue gas.

Pretreatment step c may also advantageously comprise, as part of a gas cleaning stage, the removal from the flue gas of particulate matter, such as dust (solid particles) and spray or mist droplets (liquid particles), which may be entrained by the flue gas from the flue-gas generating process.

Likewise, pretreatment step c may usefully comprise, as part of a gas cleaning stage, the removal from the flue gas of gaseous impurities which are present at a level below 1% vol in the flue gas evacuated from the combustion unit. Examples of gaseous impurities encountered at such levels in flue gases from combustion units are SOx, NOx, acid compounds (such as: HCl, HF, HCN), VOCs (Volatile Organic Compounds), ammonia, sulfur compounds other than SOx (such as $H_2S$, COS).

Pretreatment step c may thus comprise one or more of the following stages:
  drying stages
  stages for the removal of particulate matter, selected from:
    solid particle removal and/or
    liquid particle removal;
  cleaning stages, selected from:
    SOx removal (also known as deSOx),
    NOx removal (also known as deNOx),
    acid compound removal,
    VOC removal,
    ammonia removal,
    removal of sulfur compounds other than SOx.

The selection of the one or more stages of pretreatment step c is typically determined by the composition of the flue gas evacuated from the flue-gas generating unit and the compatibility with the downstream equipment of the CCUS process. The composition of the flue gas is in turn determined by the nature of the flue-gas generating unit and the parameters of the process(es) taking place therein.

For example, the parameters of a combustion process in a furnace include the nature of the fuel, the nature of the oxidant and the fuel/oxidant stoichiometry. Other parameters are temperature and pressure.

In combustion units, such as boilers, whereby the flame and the combustion gases do not come into direct contact with other process media, the composition of the flue gas is essentially determined by the combustion parameters. In combustion units, such as most metal- and glass-melting furnaces, whereby the flame and/or combustion gases come into direct contact with a medium to be heated (often referred to as the "charge" or "load"), the evacuated flue gas may also contain ingredients which were present in or on said medium or which are generated by said medium, and which may have to be removed from the flue gas during pretreatment step c of the method according to the present invention.

Typically, step c will include a particulate-removal stage and either or both of a NOx and SOx removal stage, whereby the particulate-removal stage preferably precedes the NOx and/or SOx removal stage(s).

Pretreatment step c may include a filtering stage for the removal of particulate matter, in particular for the removal of solid particulate matter. Such a filtering stage may involve electrostatic filtration, filtration by means of ceramic filters and/or filtration by means of bag filters.

Other stages which may be used for removing particulate matter from the flue gas in pretreatment step c include the use of mechanical collectors, such as cyclones, gravity settlers or baffle chambers, and the use of a wet scrubber.

When pretreatment step c, includes a SOx-removal cleaning stage and/or a NOx-removal cleaning stage, SOx, NOx or SOx and NOx removal may be performed by wet scrubbing.

When pretreatment step c includes a drying stage, water may advantageously be removed from the flue gas through condensation at a temperature below 100° C., preferably at a temperature below ambient temperature, or even below 0° C. More complete drying is achieved with decreasing temperature at which the condensation takes place. Even though the energy consumption for cooling may be higher when drying takes place at lower temperatures, the resulting reduction in flue gas volume (in $Nm^3$ dried flue gas) may make the use of smaller and therefore less expensive equipment for the pretreatment of the dried flue gas possible and increases the $CO_2$ concentration in the second part of the pretreated flue gas, which is recycled to the controlled cooling step b.

According to a preferred embodiment, pretreatment step c includes a drying stage during which water is removed from the flue gas through condensation at the temperature T3 and whereby a portion of the dried flue gas thereby obtained at temperature T3 is recycled as the second part of pretreated flue gas. As indicated earlier, the temperature at which water is removed from the flue gas during a drying stage is lower than 100° C. and may be lower than ambient temperature, even lower than 0° C.

In order to regulate controlled cooling step b, the method according to the invention may further comprise a step of detecting a temperature of the evacuated flue gas before step b and/or during step b and/or after step b. The amount (in $Nm^3$) of pretreated flue gas which is recycled as the second part of pretreated flue gas and mixed with the evacuated flue gas in step b is then advantageously regulated in function of the detected temperature or temperatures so as to obtain, at the end of step b, cooled flue gas at predetermined temperature T2. For example, when an increase in the temperature at which flue gas is evacuated from the flue-gas generating unit in step a is detected, the amount of pretreated flue gas which is recycled as the second part of pretreated flue gas may be increased and, when a decrease in the temperature at which flue gas is evacuation from the unit a is detected, the amount of pretreated flue gas which is recycled as the second part of pretreated flue gas may be decreased in order to ensure that the cooled flue gas presents predetermined temperature T2.

When, instead of or in combination with recycling of pretreated flue gas, a fraction of partially or fully purified $CO_2$ obtained at temperature T4 in step d is recycled as a cooling agent and mixed with the flue gas in cooling step b, the detected temperature or temperatures is/are similarly used to regulate the recycle flow or flows. In other words, the regulation of the amount of pretreated flue gas and/or of partially or fully purified $CO_2$ is determined by the degree of flue-gas cooling required in step b.

When controlled cooling step b comprises one or more additional flue-gas cooling processes, such as cooling by heat exchange in a heat exchanger, these additional flue-gas cooling processes may be controlled in a manner known in the art.

When the temperature T3 of the recycled pretreated flue gas, and thus also its cooling capacity, can vary in the course of the method, said method may also include a step of detecting temperature T3 of the pretreated flue gas. The value of the thus detected temperature T3 may then be taken into account when regulating the used in the amount (in $Nm^3$) of pretreated flue gas which is recycled as the second part of pretreated flue gas and mixed with the evacuated flue gas in step b. Typically, the recycled amount is increased when detected temperature T3 increases and is decreased when detected temperature T3 decreases.

According to a preferred embodiment, the flue gas which is evacuated from the flue-gas generating unit in step a comprises or consists of combustion gas generated by combustion of a carbon-containing fuel with a combustion oxidant containing 21% to 100% by volume oxygen, preferably at least 30% by volume, more preferably at least 60% by volume and even more preferably at least 90% by volume oxygen.

In the context of the present invention, the term "fuel" covers conventional fuels, such as coal, natural gas, and liquid and gaseous hydrocarbons. However, the term "fuel" also covers combustible matter other than conventional fuels and which are combusted in the combustion unit. For example, in biomass combustion units, the fuel is the biomass and in waste incineration installations, the fuel is the waste which is burnt therein. The fuel can also be a combination of conventional and unconventional fuel.

The method according to the invention may be used for treating a flue gas generated by a combustion unit, whereby flue gas evacuated in step a contains, for a total of 100% vol of gaseous components (concentration based on wet basis):
  5 to 20% vol $CO_2$;
  5 to 30% vol $H_2O$;
  0 to 10% vol $O_2$, preferably 0 to 5%;
  50 to 80% vol $N_2$; and
  0 to 3% vol of one or more other gases.

Such a flue gas may for example be generated by a combustion unit in which fuel is combusted with air as the combustion oxidant.

Alternatively, the method according to the invention may be used for treating a flue gas generated by a combustion unit, whereby the flue gas evacuated in step a contains, for a total of 100% vol of gaseous components (concentration based on wet basis):
  15 to 55% vol $CO_2$;
  40 to 80% vol $H_2O$;
  0 to 10% vol $O_2$, preferably 0 to 5%;
  0 to 3% vol argon;
  0 to 20% vol $N_2$, preferably 0 to 10%; and
  0 to 3% vol of one or more other gases.

Such a flue gas may for example be generated by a combustion unit in which oxycombustion takes place.

The temperature T1 at which the flue gas is evacuated from the flue-gas-generating unit depends on the nature of the unit and the process taking place therein, or even, for example in the case of batch or cyclical processes, the phase of the process taking place therein. In step a, the flue gas may, for example, be evacuated from a combustion unit at a temperature of 400° C. to 1600° C., preferably at a temperature of 600° C. to 1500° C. and more preferably at a temperature of 800° C. to 1500° C.

The method according to the invention is suitable for a wide range of installations/processes. The method is in particular useful for the treatment of flue gas from combustion units, and more specifically combustion units selected from glass melting furnaces, glass refining furnaces, glass melting-and-refining furnaces, steel reheating furnaces, Electric Arc furnaces, non-ferrous smelting and melting furnaces, cement furnaces, lime furnaces, enamel furnaces and hot stoves The method according to the invention is also suitable for other high-temperature flue-gas-generating units including non-ferrous primary electrolyzer, ferrous primary electrolyzer, cokery, electric furnace for glass melting, electric furnace for special metal melting or heat treatment.

The method according to the invention may be used in combination with most CCUS processes as step d of the method.

As indicated earlier, during the CCUS of step d, the pretreated flue gas is purified so as to obtain $CO_2$ of the purity required for Sequestration and/or Use.

In the present context, "purification" refers to the removal from the flue gas, or more specifically from the first part of the pretreated flue gas, of gaseous components other than $CO_2$ which are present at a level of at least 1% vol (i.e. 1% by volume or more, typically more than 1% by volume) in the flue gas evacuated from the combustion unit.

When the flue gas evacuated in step a contains $N_2$, the first part of pretreated flue gas may be purified during step d by the removal of $N_2$ therefrom.

The CCUS process of step d, may be a CCU process to which the first part of the dried flue gas is subjected during step d.

One possible utilisation of the captured $CO_2$ in CCU processes is the conversion of the captured carbon dioxide into valuable substances or products, such as plastics, concrete, aggregates or fuel.

High purity captured $CO_2$ may also find use in the food industry, for example in the production of fizzy drinks.

Another possible use for captured $CO_2$ is as displacement gas in assisted oil recovery.

A further aspect of the present invention is an installation suitable for use in the method according to any one of the above described embodiments.

The invention thus also relates to an installation for treating a $CO_2$- and $H_2O$-containing stream of flue gas.

Said installation defines a flue-gas flow path which comprises:

a. an inlet for receiving the gas stream at a temperature T1 from a flue-gas-generating unit,
b. a cooling unit for controlled cooling to a temperature T2<T1 of the gas stream received through the inlet,
c. a pretreating unit for pretreating the cooled gas stream from the cooling unit, the pretreating unit comprising one or more of the following gas-pretreatment devices: gas dryer/dehumidifier, particle remover and gas cleaner, at least one device of the pretreating unit including a cooler adapted to cool the gas stream further to a temperature T3<T2, and
d. an outlet downstream of the pretreating unit, said outlet connecting the flue-gas flow path to a CCUS plant.

In accordance with the present invention, the cooling unit comprises a gas mixer at or downstream of the inlet of the flue-gas flow path. The installation moreover comprises a gas recycle loop between, on the one hand, a tapping point at or downstream of the pretreating unit, and, on the other hand, the gas mixer of the cooling unit. Said recycle loop is adapted to recycle a portion of the gas stream at temperature T3 to the gas mixer where the recycled portion of the flue gas is mixed with the gas stream, thereby causing the gas stream to be cooled.

Preferably, the installation further comprises a control unit and a recycle flow controller, such as a flow control valve. The control unit is adapted to regulate, by means of the recycle flow controller, the portion of the gas stream which is recycled through the gas recycle loop. The control unit regulates the portion of the gas stream which is recycled so that the gas stream is cooled to the temperature T2 in the cooling unit.

In that case, the installation preferably further comprises at least one temperature sensor for detecting a temperature of the gas stream upstream of the gas mixer and/or in the gas mixer and/or downstream of the gas mixer. The control unit is connected to the at least one temperature sensor and is adapted to regulate, by means of the recycle flow controller, the portion of the gas stream which is recycled in function of temperature T2 and the at least one temperature detected by the at least one temperature sensor.

When the pretreating unit comprises a particle remover for removing particulate matter from the gas stream, the pretreating unit may comprise a solid particle remover and/or a liquid particle removal.

Examples of suitable particle removers are particle filters, such as electrostatic filters, ceramic filters and/or bag filters. Other suitable particle removers are mechanical particle collectors, such as cyclones, gravity settlers or baffle chambers. Another possible particle remover is a wet scrubber.

When the pretreating unit comprises a gas cleaner, the pretreating unit may include one or more of a deSOx device, a deNOx device, an acid compound remover, a VOC remover, an ammonia remover and a remover for the removal of sulfur compounds other than SOx. Such removers may also be in the form of a wet scrubber. The gas cleaner is advantageously located downstream of a particle remover and/or upstream of a gas dryer.

When the pretreating unit comprises a gas dryer or dehumidifier, the pretreating unit advantageously comprises at least one gas dryer in the form of a water condenser, whereby the condenser is equipped with a cooler adapted and regulated to cool the gas stream to a temperature T3 below 100° C. and whereby the tapping point of the gas recycle loop is located downstream of the water condenser, so as to enable a portion of the dried gas stream at temperature T3 to be recycled via the tapping point and the recycle loop to the gas mixer. The cooler of the condenser is preferably adapted and regulated to cool the gas stream to a temperature T3 below ambient temperature, or even below 0° C.

According to a preferred embodiment, pretreatment step c includes a drying stage during which water is removed from the flue gas through condensation at the temperature T3 and whereby a portion of the dried flue gas thereby obtained at temperature T3 is recycled as the second part of pretreated flue gas. As indicated earlier, the temperature at which water is removed from the flue gas during a drying stage is lower than 100° C. and may be lower than ambient temperature, even lower than 0° C.

According to an alternative embodiment, which may or may not be combined with the above-described embodiments, the installation according to the present invention comprises a recycle loop between, on the one hand, a tapping point in the CCUS plant, where fully or partially purified $CO_2$ obtained by completed or partial purification of pretreated flue gas from the pretreating unit, can be withdrawn from the CCUS plant, and, on the other hand, the gas mixer of the cooling unit, the recycle loop being adapted to recycle tapped fully or partially purified $CO_2$ from the CCUS plant at a T4<T1 to the gas mixer, where the recycled $CO_2$ is mixed with the gas stream.

In that case as well, the installation may further comprise a control unit and a recycle flow controller, the control unit being adapted to regulate, by means of the recycle flow controller, the $CO_2$ flow which is recycled through the recycle loop so that in the cooling unit the gas stream (100) is cooled to the temperature T2. Such an installation may advantageously further comprise at least one temperature sensor for detecting a temperature of the gas stream upstream of, in, and/or downstream of the gas mixer, the control unit being connected to the at least one temperature sensor and being adapted to regulate, by means of the recycle flow controller, the $CO_2$ flow from the CCUS which is recycled in function of the at least one temperature detected by the at least one temperature sensor.

According to a useful embodiment, the flue-gas generating unit is or comprises a combustion unit, i.e. a combustion furnace.

In the combustion unit, a carbon-containing fuel is typically combusted with a combustion oxidant containing 21% to 100% by volume oxygen.

According to a useful embodiment, the inlet of the flue-gas flow path is fluidly connected to a combustion unit in which a carbon-containing fuel is combusted with air as the combustion oxidant.

According to a particularly useful embodiment, the inlet of the flue-gas flow path is fluidly connected to a combustion unit in which a carbon-containing fuel is combusted with a combustion oxidant comprising at least 30% by volume, more preferably at least 60% by volume and even more preferably at least 90% by volume oxygen.

Combustion units of particular interest are glass-melting furnaces, glass refining furnaces, glass melting-and-refining furnaces, steel reheating furnaces, Electric Arc furnaces, non-ferrous smelting and melting furnaces, cement furnaces, lime furnaces, enamel furnaces and hot stoves.

Other flue-gas-generating units from which the inlet of the flue-gas flow path may receive a stream of flue gas include non-ferrous primary electrolyzers, ferrous primary electrolyzers, cokery furnaces, electric furnaces for glass melting, electric furnaces for special metal melting and electric furnaces for metal heat treatment.

When multiple installations generating a $CO_2$- and $H_2O$-containing flue gas are present, the inlet of the flue-gas flow path may receive the stream of flue gas from multiple such flue-gas-generating installations. In other words, in that case, the flue-gas-generating unit contains multiple flue-gas-generating installations.

According to a useful embodiment, the CCUS plant, which is connected to the flue-gas flow path via the outlet downstream of the pretreating unit, is a CCU plant.

Transitional phases will obviously take place, for example during start up and stop of the flue gas generating unit and of the CCUS plant. There are several ways to manage these transitional phases. As an example, according to a useful embodiment of the invention, other cooling fluids like air or $CO_2$ or other cooling equipments, like a cooler, can be used during transitional phases to replace completely or partially the recycled flue gas.

According to a useful embodiment, the flue gas which is recycled can be replaced totally or partially by any stream which can be extracted from the CCUS plant including the $CO_2$ of the purity required for Sequestration and/or Use.

BRIEF DESCRIPTION OF THE DRAWING

The present invention and its advantages will be better understood in the light of the following example of an embodiment, whereby the cooling agent consists of part of the pretreated flue gas, reference being made to the FIGURE.

For a further understanding of the nature and objects for the present invention, reference should be made to the following detailed description, taken in conjunction with the accompanying drawing, in which like elements are given the same or analogous reference numbers and wherein:

FIG. 1 illustrates a schematic representation of an installation in which the method according to the present invention is used to treat a furnace flue gas which contains $CO_2$ and $H_2O$.

DETAILED DESCRIPTION OF PREFERRED EMBODIMENTS

The present invention and its advantages will be better understood in the light of the following example of an embodiment, whereby the cooling agent consists of part of the pretreated flue gas, reference being made to the FIGURE, which is a schematic representation of an installation in which the method according to the present invention is used to treat a furnace flue gas which contains $CO_2$ and $H_2O$.

Furnace (oven) B-100 burns fuel with an oxidizer agent to produce thermal energy to heat a charge, such as a non-ferrous metal charge to be melted. As a byproduct, flue gas 100 containing carbon dioxide and water vapour is produced. At least a major part of the carbon dioxide and of the water vapour in the flue gas results directly from the oxidation (combustion) of the fuel.

The flue gas 100 leaves furnace B-100 at high temperature T1 and contains a non-negligible portion of the thermal energy generated in furnace B-100 (also referred to as "residual heat").

Flue gas 100 also contains entrained particulate matter (in particular, dust) and sulphur oxides (SOx) which must be removed from flue gas by filtration.

However, the initial temperature T1 of the evacuated flue gas 100 is so high that introducing flue gas 100 directly into the filtration equipment would rapidly damage the latter.

It would be useful if one could simply recover the residual thermal energy from flue gas and use said residual thermal energy in the production process, for example by using said thermal energy to preheat the fuel and/or the oxidizer agent through heat exchange between the flue gas and the respective combustion agents. However, initial temperature T1 of the evacuated flue gas 100 is also too high for the heat exchangers normally used for that purpose.

It is thus necessary to reduce the temperature of flue gas 100 before filtration or even energy recovery may be performed.

In the illustrated method according to the invention, this is achieved by controlled cooling of flue gas 100 to a temperature T2 below T1 which is compatible with heat exchangers and filtration equipment.

In accordance with the invention, said controlled cooling of flue gas 100 is more specifically achieved by mixing flue gas 100 in mixer V200 with a controlled amount of recycle gas 301, which has a temperature T3 below T2. The result is a stream of cooled flue gas 200, consisting of a mixture of flue gas 100 and recycle gas 301. The amount of recycle gas 301 mixed with flue gas 100 is chosen so that temperature T2 of the cooled flue gas 200 is temperature compatible with the downstream equipment to which cooled flue gas 200 is sent.

Although not illustrated in the FIGURE, the step of controlled cooling by mixing with recycle gas 301 can be combined with additional cooling, in particular through heat recovery.

The cooled mixed flue gas 200 is processed in one or more cleaning steps, such as dedusting, SOx removal and NOx removal. In the illustrated embodiment, $Ca(OH)_2$ 201 is injected into cooled flue gas 200 as a first cleaning agent causing the SOx present therein to react with the $Ca(OH)_2$ to form $CaSO_3$ and/or $CaSO_4$. Cooled flue gas 200 is then sent to filter F-210, where particles, such as dust, and the sulfur salts are removed from the cooled flue gas 200. Thereafter, the partially cleaned flue gas 210, is subjected to a further cleaning step to eliminate NOx present in the flue gas. Thereto, urea 211 is introduced into the partially cleaned flue gas 210. In reactor R220, the NOx is reduced to $N_2$ by reaction with the urea 211, used as a reducing agent.

The resulting dedusted, deSOxed and deNOxed flue gas 220 is thereafter dehumidified in condenser D230. In condenser D230 the cleaned flue gas 220 is cooled to temperature $T3_{bis}$ so as to cause water vapour present in the flue gas to condense to liquid water which is drained from D230.

The cleaned and dried flue gas 230 at temperature $T3_{bis\,i}$ is then slightly reheated to temperature T3 in heat exchanger E240 to avoid liquid water condensation in the downstream equipment. The cleaned and dried flue gas 240 is then split into a stream 400 towards CCUS and a recycle stream 300. The fan C300 is increasing the pressure of stream 300. The so obtained stream 301 then has sufficient pressure to be mixed with evacuated flue gas 100 to cool it. The advantages of the method according to the present invention are multiple and immediately apparent.

Recycle gas 301 consists of cleaned dried flue gas and has a $CO_2$ content which is higher than that of evacuated flue gas 100.

As indicated earlier, the installation advantageously includes at least one temperature sensor (not shown) for detecting a temperature of the gas stream upstream of, in, and/or downstream of the gas mixer, a control unit (not shown) connected to the at least one temperature sensor and adapted to regulate, by means of fan C300 the flow (in $Nm^3$) of pretreated flue gas 301 which is recycled in function of the at least one temperature or temperatures detected by said temperature sensor or sensors.

Compared to the known method of cooling by ambient air injection, whereby the evacuated flue gas is diluted with ambient air, with the method according to the invention, the controlled cooling step does not cause a reduction of the $CO_2$ content of the flue gas, but instead actually causes an increase of the $CO_2$ content of the flue gas, thereby improving the efficiency of the CCUS process in step d.

In addition, compared to said known method, the changes to the equipment are minimal and the known particle removal, cleaning, drying and CCUS equipment can also be used in the method and installation of the invention.

The effectiveness and interest of the present invention is illustrated in the table below, which lists the properties, more specifically temperature, flow rate and composition (gaseous components with concentration higher than 1% volume), of the different flue gas streams when a combustion flue gas containing 37% by weight $CO_2$ and 56% by weight $H_2O$ was evacuated from a furnace at a rate of 1000 $Nm^3/h$ and at a temperature of 750° C., is treated in by means of an installation as illustrated in the FIGURE.

For the sake of clarity, the enthalpy of the vapour phase is also shown,

Regarding the enthalpy flows also shown in the table, the values include both chemical and sensible enthalpy, and lead to thermal losses of 140 kW between the cooled flue gas 200 and pretreated flue gas 220, and 550 kW between 220 and 230.

|  | flue gas stream (reference number as used in the figure) | | | | | | | |
| --- | --- | --- | --- | --- | --- | --- | --- | --- |
|  | 100 | 200 | 210 | 220 | 230 | 240 | 300/301 | 400 |
| Temperature (° C.) | 750 (T1) | 455 (T2) | 350 | 300 | 25 ($T3_{bis}$) | 30 (T3) | 30 | 30 |
| Flow rate ($Nm^3/h$) | 1000 | 1726 | 1726 | 1726 | 1181 | 1181 | 726 | 455 |
| Water ($H_2O$) content (% volume) | 56 | 33.8 | 33.8 | 33.8 | 3.3 | 3.3 | 3.3 | 3.3 |
| Oxygen ($O_2$) content (% volume) | 1 | 1.5 | 1.5 | 1.5 | 2.2 | 2.2 | 2.2 | 2.2 |
| Nitrogen ($N_2$) content (% volume) | 6.0 | 9.1 | 9.1 | 9.1 | 13.2 | 13.2 | 13.2 | 13.2 |
| Carbon dioxide $CO_2$ content (% volume) | 37 | 55.6 | 55.6 | 55.6 | 81.3 | 81.3 | 81.3 | 81.3 |
| Enthalpy flow (kW) | −3105 | −6049 |  | −6189 | −4811 | −4810 | −2944 | −1865 |

As shown, the method according to the present invention makes it possible to more than double the $CO_2$ content (from 37 to 80.4% volume) through the controlled cooling and controlled cooling and pretreatment of the evacuated flue gas upstream of CCUS.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method of treating a carbon dioxide and water containing flue gas generated by a flue-gas-generating unit, comprising:
   a. evacuating a flue gas from a flue-gas-generating unit at a first temperature T1,
   b. controlled cooling of the evacuated flue gas to a second temperature T2, wherein T2<T1 and wherein T2 is between 100 and 600° C., and
   c. pretreating the cooled flue gas in one or more particle removal and/or gas cleaning and/or drying stages, whereby the temperature of the cooled flue gas is further reduced to a third temperature T3, wherein T3<T2,
   d. subjecting a first part of the pretreated flue gas to Carbon Capture Utilization and/or Storage,
   wherein:
      a second part of the pretreated flue gas is recycled at the third temperature T3 as a cooling agent and mixed with the flue gas in step b
   and/or
      wherein the Carbon Capture Utilization and/or Storage includes a substep of purifying the first part by removing gaseous components other than carbon dioxide which are present at a level of at least 1% vol therefrom so as to obtain purified carbon dioxide whereby said substep optionally comprises a succession of multiple purification stages terminating in a final purification stage, whereby the stage or stages preceding the final purification generate partially purified carbon dioxide, whereby a fraction of the partially or fully purified carbon dioxide obtained at a fourth temperature T4, wherein T4<T2 is recycled as a cooling agent and mixed with the flue gas,
   whereby the flue gas evacuated in step a comprises combustion gas generated by combustion of a carbon-containing fuel with a combustion oxidant containing 21% to 100% by volume oxygen.

2. A method of treating a carbon dioxide and water containing flue gas generated by a flue-gas-generating unit, comprising:
   a. evacuating a flue gas from a flue-gas-generating unit at a first temperature T1,
   b. controlled cooling of the evacuated flue gas to a second temperature T2, wherein T2<T1 and wherein T2 is between 100 and 600° C., and
   c. pretreating the cooled flue gas in one or more particle removal and/or gas cleaning and/or drying stages, whereby the temperature of the cooled flue pas is further reduced to a third temperature T3, wherein T3<T2,
   d. subjecting a first part of the pretreated flue gas to Carbon Capture Utilization and/or Storage,
   wherein:

a second part of the pretreated flue gas is recycled at the third temperature T3 as a cooling agent and mixed with the flue gas in step b and/or wherein the Carbon Capture Utilization and/or Storage includes a substep of purifying the first part by removing gaseous components other than carbon dioxide which are present at a level of at least 1% vol therefrom so as to obtain purified carbon dioxide whereby said substep optionally comprises a succession of multiple purification stages terminating in a final purification stage, whereby the stage or stages preceding the final purification generate partially purified carbon dioxide, whereby a fraction of the partially or fully purified carbon dioxide obtained at a fourth temperature T4, wherein T4<T2 is recycled as a cooling agent and mixed with the flue gas, whereby the flue-gas-generating unit comprises a unit selected from glass melting furnaces, glass refining furnaces, glass melting-and-refining furnaces, steel reheating furnaces, Electric Arc furnace, non-ferrous smelting and melting furnaces, cement furnaces, lime furnaces, enamel furnaces, hot stoves, electrolysers for primary metal production, cokery furnaces, electric furnaces for glass melting, electric furnaces for special metal melting and electrical furnaces for metal heat treatment.

3. An installation for treating a carbon dioxide- and water-containing stream of flue gas generated by a flue-pas-generating unit, the installation defining a flue-gas flow path, the flue-gas flow path comprising:

a. an inlet for receiving the gas stream from the unit, b. a cooling unit for controlled cooling to a second temperature of the gas stream received through the inlet, c. a pretreating unit for pretreating the cooled gas stream from the cooling unit, the pretreating unit comprising one or more of the following gas-pretreatment devices: gas dryer/dehumidifier, particle remover and gas cleaner, at least one device of the pretreating unit including a cooler adapted to cool the gas stream further to a third temperature T3, wherein T3<T2, and d. an outlet downstream of the pretreating unit, said outlet connecting the flue-gas flow path to a Carbon Capture Utilization and/or Storage plant, wherein:

the cooling unit comprises a gas mixer at or downstream of the inlet of the flue-gas flow path and the installation further comprises a gas recycle loop between, on the one hand, a tapping point at or downstream of the pretreating unit, and, on the other hand, the gas mixer of the cooling unit, the recycle loop being adapted to recycle a portion of the gas stream at a third temperature to the gas mixer where the recycled portion of the flue gas) is mixed with the gas stream, thereby causing the gas stream to be cooled, whereby the flue-gas-generating unit comprises a combustion unit and/or another industrial process, whereby the combustion unit is selected from glass melting furnaces, glass refining furnaces, glass melting-and-refining furnaces, steel reheating furnaces, Electric Arc furnace, non-ferrous smelting and melting furnaces, cement furnaces, lime furnaces, enamel furnaces, hot stoves, electrolysers for primary metal production, cokery furnaces, electric furnaces for glass melting, electric furnaces for special metal melting and electrical furnaces for metal or heat treatment.

\* \* \* \* \*